GEORGE STEVEN
WILLIAM M. KAUFFMANN
INVENTORS

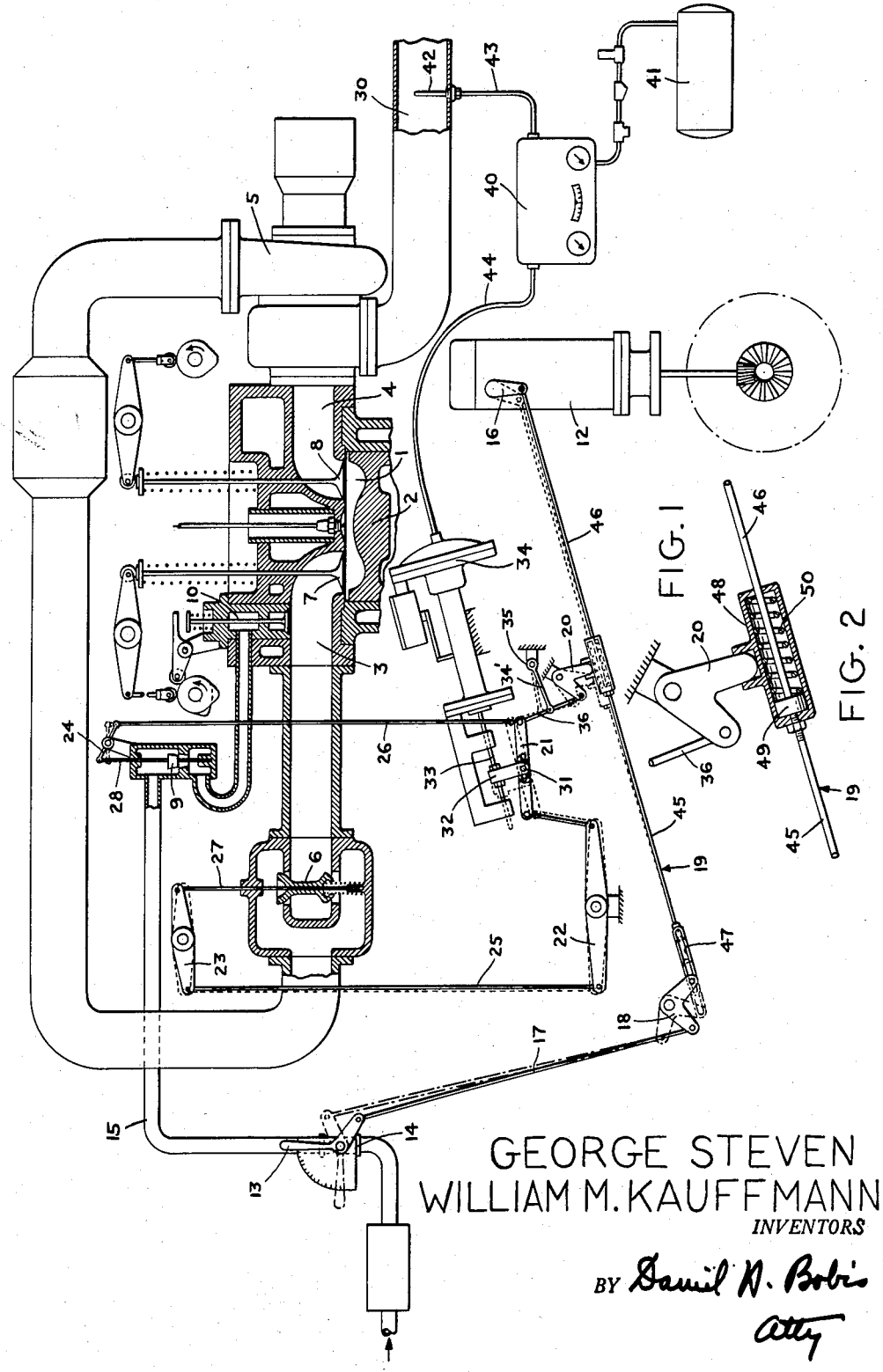

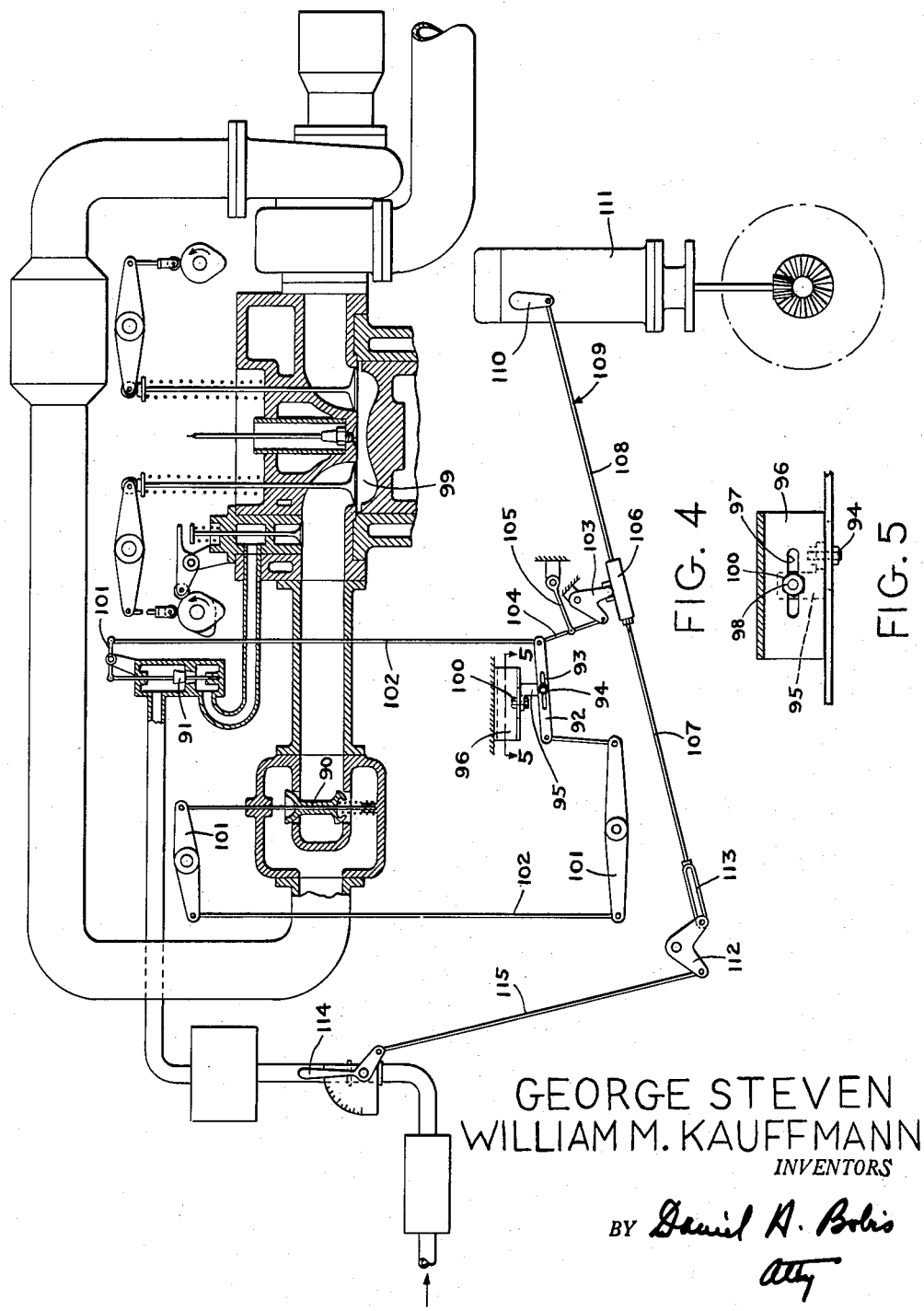

United States Patent Office 2,744,511
Patented May 8, 1956

2,744,511

APPARATUS FOR CONTROLLING PROPORTIONATE DELIVERY OF AIR AND GAS TO A SUPERCHARGED INTERNAL COMBUSTION ENGINE

William M. Kauffmann, Hamburg, and George Steven, Kenmore, N. Y., assignors to Worthington Corporation, Harrison, N. J., a corporation of Delaware Application February 4, 1955, Serial No. 486,152

8 Claims. (Cl. 123—120)

This invention relates to high compression supercharged spark ignition engines and more particularly to an apparatus for controlling the proportional quantities of air and gas delivered to the cylinders of such an engine in accordance with low demand on the engine.

A supercharged spark ignition internal combustion engine utilizing gaseous fuels such as natural gas, sewer gas, manufactured gas, etc., with a high compression ratio in a range of approximately 8 to 14 to 1 requires a leaner mixture of gaseous fuel and air that that required by a naturally aspirated gas engine. With such lean mixtures the tendency of fuel stratification in the combustion chamber is present, which with unbalanced combustion in a multiple cylinder engine will cause detonation. Accurate metering of gas and air to the individual cylinders in a constant and uniform ratio throughout the load range will eliminate detonation. Also, in engines of this type excessive lean mixtures of gas and air at partial load will cause misfiring of the engine.

The principal object of the present invention is to provide an apparatus which will control or provide the correct relationship of gas and air fuel ratio from no load operating conditions of the engine to full load operating conditions, which is in response to the governor, but will at the same time maintain a desired rich mixture of gaseous fuel and air at partial load operating conditions and a lean mixture of gaseous fuel and air at full load operation of the engine and to provide a thermally responsive servo-mechanism operable at variances in the exhaust temperature of the engine to adjust the governor responsive means to vary the proportionate flow of gaseous fuel and air to the combustion chambers of the engine.

With these and other objects in view, as may appear from the accompanying specification, the invention consists of various features of construction and combination of parts, which will be first described in connection with the accompanying drawings.

In the drawings:

Figure 1 is a fragmentary diagrammatic view partially in section illustrating the control mechanism of the present invention applied to a spark ignition engine.

Figure 2 is a detail section of a part of the construction.

Figure 4 is a view of a modified form of the invention wherein the proportionate operating fuel feeding actions of the gas and air valves are manually controlled, and Figure 5 is a detailed section taken on the line 5—5 of Figure 4.

Figure 3:
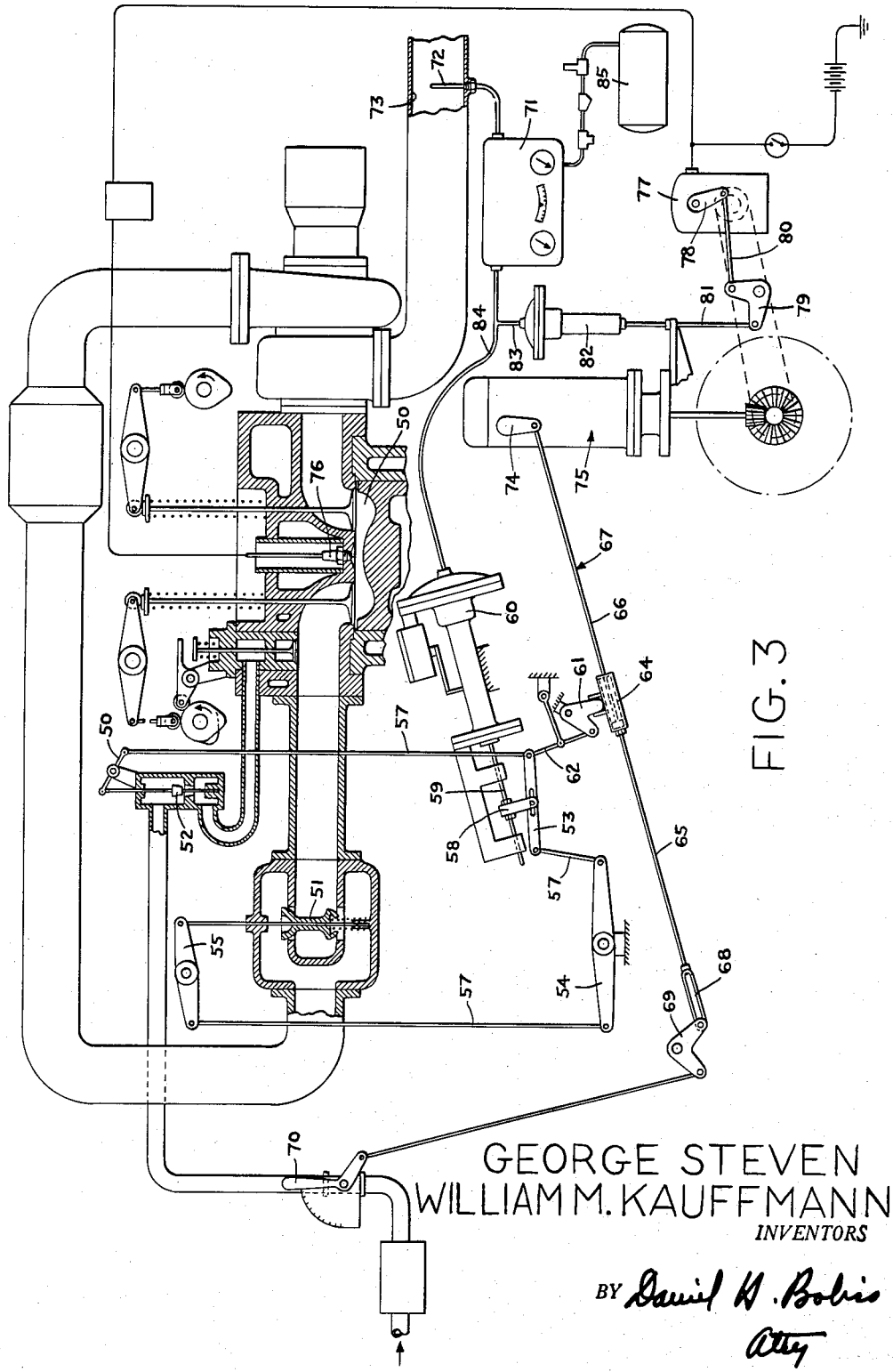
Figure 3 is a diagrammatic view partially in section of a modified form of the invention embodying means for controlling the timing of the firing of the ignition spark plugs of the engine.

Referring particularly to Figures 1 and 2 of the drawings, which show a high compression spark ignition gas engine embodying a cylinder 1, piston 2 mounted for reciprocatory movement in the cylinder 1 and having inlet and exhaust passages 3 and 4 respectively communicating therewith. The engine is of the supercharged type, and the air which is mixed with the gas to form the fuel of combustion of the engine is delivered from the supercharger 5 through the air metering valve 6 to the inlet passage 3. Delivery of fuel from the inlet passage 3 into the cylinder 1 is controlled by the inlet valve 7 and exhaust of burned gases from the cylinder is controlled by the exhaust valve 8. The gas, such as natural gas, sewer gas, manufactured gas or the like is delivered to the intake passage 3 through the gas metering valve structure 9 and cam operated valve 10 and the gas admitted to the intake passage 3 mixes with the incoming air and is delivered to the cylinder 1 when the intake valve 7 is open. This is the usual construction of gas engines of this type.

Operation of the air metering valve 6 and the gas metering valve 9 are under control of the governor 12 of the engine structure and the present invention embodies means for varying the degree of relative opening of these valves to vary the proportion of gas to air to the fuel supplied to the engine.

Stop and start of the engine is controlled by a manually operated lever 13 which operates a valve structure 14 in the gas supply line 15 and also operates the arm 16 of the governor mechanism 12 through the medium of the rod 17, bell-crank 18 and rod 19. Operation of the air metering valve 6 and the gas metering valve 9 is then controlled by the governor through the rod 19, the bell crank 20, a floating lever 21 and pivoted levers 22, 23 and 24 connected to the floating lever 21 by suitable rod connections 25 and 26. The levers 23 and 24 connected to the valve stems 27 and 28 of the air valve 6 and gas valve 9 respectively. In normal conditions the operation of air and gas valves 6 and 9 are controlled in accordance with load demand on the engine by the governor 12. However, in the construction of the present invention shown in Figure 1 and 2 of the drawings, the operation of these two valves is controlled to vary the proportion of the air and the gas delivered to the engine in accordance with operating conditions of the engine.

In engines of this type, the operating conditions of the engine are truly represented by the temperature of the exhaust gas in the exhaust manifold 30 of the engine and to provide the proper proportions of air and gas in the cylinder 1 at all times during the running of the engine to provide proper and efficient operation of the engine, means controlled by the temperature of the exhaust in the exhaust manifold 30 are provided for controlling the relative degree of opening of the air valve 6 and the metering gas valve 9.

The floating lever 21 is pivotally mounted intermediate its ends as shown at 31 on a fulcrum 32 and fulcrum 32 is carried by a rod 33 operated or moved by a pressure fluid actuated diaphragm structure 34 to vary the position of the fulcrum 32 and consequently vary the pivotal point of the lever 21. The position of the floating lever 21 is regulated or controlled by means of an arm 34 pivotally supported at 35 and connected to the arm 36 intermediate its ends. The arm 36 connects the bell crank 20 to one end of the floating lever 21 so that varying of the position of the fulcrum 32 by operation of the pressure operated diaphragm structure 34 will vary the proportionate or relative degree of opening of the valves 6 and 9 and will accordingly vary the proportionate quantities of the air and gas delivered to the intake passage 3 upon pivotal movement of the lever 21 from the governor 12 through the medium of the rod 19 and the bell crank 20.

The pressure operated diaphragm structure 34 is of any approved type of such structures which are well known and which may be purchased upon the open market and it is operated by pressure air delivered thereto through an automatic controller 40 of any suitable source of compressed air such as a tank indicated at 41.

The automatic controller 40 is a mechanism which measures the value of a variable quantity or condition and operates to correct it to a selected value and such controllers are well known and may be purchase upon the open market, being manufactured by the Bristol Company, Moore Products Company and others.

In the application of the controller 40 in the present invention it utilizes the temperature of the exhaust gases of the engine through a temperature sensitive element 42 (which also is well known and may be purchased upon the open market) mounted in exhaust manifold 30. Variances in the temperature of the exhaust gases of the engine are transmitted as pressure by and through the temperature element 42 and the tube 43 to the controller 40 and acts as the control pressure which regulates the delivery of air from the pressure air supply source 41 through the controller 40 and conduit 44 to the pressure operated diaphragm structure 34.

As clearly shown in the drawings, the rod 19 is composed of sections 45 and 46, the section 45 having a slotted end 18 providing a sliding connection with the bell crank 18. A rod section 45 has a cylinder 48 connected to its end remote from its slotted end and the bell crank 20 is connected to and operated by movement of this cylinder 48. The section 46 of the rod 19 has a piston 49 mounted thereon which is in turn mounted in the cylinder 48 and is urged into engagement with one end of the cylinder by a spring 50 thus providing relative movement of the rod sections 59 and 46 and movement of the rod 19 relative to the crank arm 18 but permitting operation of the governor lever 16 and bell crank 20 by the stop and start lever 13 and also permitting operation of the bell crank 20 and the floating lever 21 connected thereto by means of the governor lever 16 without interfering with the manually operated stop and start lever 13, thereby permitting initial operation of the valves 6 and 9 upon the starting of the engine by means of the lever 13 and subsequent operation of these valves by the governor 12 without interference with or by the lever 13.

The form of the invention shown in Figure 3 of the drawings is similar to that shown in Figures 1 and 2 of the drawings embodying in combination with the combustion chamber or cylinder 50 of a gas engine the air metering valve 51 and gas metering valve 52 which are operated from the floating lever 53 through the medium of suitable levers 54, 55 and 56 and rods 57. The fulcrum 58 on which the floating lever 53 is pivoted is adjusted by movement of the rod 59 of the pressure operated diaphragm structure 60. The floating lever 53 is operated from the bell crank 61 through the medium of the arms 62 in the same manner in which the floating lever 21 of the structure shown in Figure 1 of the drawings is operated. The bell crank lever 61 is connected to the cylinder 64 which serves as a yielding coupling of the sections 65 and 66 of the rod 67 and this rod 67 is connected by a slip joint 68 to the bell crank 69 which is in turn operated by the stop and start manually operated lever 70. Control delivery of pressure fluid to the pressure operated diaphragm structure 69 is through the controller 71 through the medium of the thermal element 72 positioned in the exhaust manifold 73 of the engine. The rod 67 is connected to the lever 74 of the governor 75 and the mechanism just described in this form of the invention operates in exactly the same manner as described in connection with the mechanism disclosed in Figures 1 and 2 of the drawings.

In gas engines of this type ignition is provided by energizing of spark plugs one of which is indicated at 76, and the form of the invention shown in Figure 3 of the drawings contemplates means for automatically regulating the timing of the energizing of the spark plugs and consequently ignition of the fuel in the combustion chamber or cylinder 50 in accordance with the adjustment and operation of the valves 51 and 52. As is usual in spark ignition gas fuel internal combustion engines a magneto timer 77 is employed for controlling the energizing of the spark plug 76 and such magneto timer includes an adjustable timing control setting lever 78. In the present invention, this lever 78 is connected to a bell crank 79 by means of a suitable rod 80 and the bell crank 79 is connected to the rod 81 of a pressure operated diaphragm motor or structure 82. The pressure operated diaphragm motor structure 82 may be of any preferred form which may be purchased upon the open market and of the same construction as the diaphragm structure or motor 60. The pressure fluid is delivered to the diaphragm motor 82 through a suitable conduit 83 which is connected to the conduit 84 between the controller 71 and the pressure operated diaphragm unit 60, thus air under pressure from the source of supply 85 will be delivered simultaneously in equal quantities and pressures to the diaphragm units 60 and 82 to operate them in unison for unitary control of the adjusting of the fulcrum 58 for controlling the operation of the valves 51 and 52 with the operation of the lever 78 of the magneto timer 77 to properly time the energizing of the spark plug 76 and consequently of the sparking of this plug and the ignition of the fuel in the combustion chamber or cylinder 50 of the engine.

Figures 4 and 5 of the drawings show a further modification of the present invention wherein the proportionate fuel feeding operations of the air metering valve 90 and the gas metering valve 91 are controlled by a manually set mechanism for positioning the fulcrum of the floating lever 92 which corresponds to the floating lever 21 in Figure 1 of the drawings. The floating lever 92 is provided with a slot 93 through which its pivotal member 94 extends and the pivotal member 94 is carried by the fulcrum element 95. The fulcrum element 95 is adjustably connected to a bracket 96 through the medium of a slot 97 and a bolt 98 and thus, by experiment, when the engine is first run on the type of gas with which it is to be subsequently operated the best proportionate supply of gas and air to the cylinder or combustion chamber 99 of the engine is determined and the fulcrum 95 is positioned on its carrying bracket 96 to provide such opening of the valves 90 and 91 as to provide this best or most efficient determined proportionate quantities of air and gaseous fuel to be fed to the combustion chamber, after which the fulcrum 95 is held in such adjusted position by means of the bolt 98 and nuts 100.

The floating lever 92 is connected to the valves 90 and 91 through a series of levers 101 and rods 102 in the same manner in which the floating lever 21 is connected to the valves 6 and 9 and, furthermore, the floating lever is operated from the bell crank 103 through the medium of the arm 104. The movement of the lever 92 by the arm 104 and its relative positioning is regulated by the pivoted arm 105 which corresponds to the arm 34 shown and described in Figure 1. The bell crank 103 is connected to the cylinder 106 which yieldably connects the sections 107 and 108 of the rod 109. The rod 109 is connected to the lever 110 of the governor 111 and it is also connected to the bell crank 112 by the sliding or slip coupling 113. The bell crank 112 is operated by the manually operated stop and start lever 114 through the medium of the suitable connecting rod 115.

This construction of the invention shown in Figures 4 and 5 differs only from that shown in Figure 1 in that the setting of the fulcrum 98 is carried out manually in lieu of automatically through the medium of temperature variances of the exhaust in the exhaust outlet of the engine.

It will be understood that the invention is not to be limited to the specific construction or arrangement of parts shown, but that they may be widely modified within the invention defined by the claims.

What is claimed is:

1. In an internal combustion engine including a cylinder, a governor, and having an exhaust outlet manifold, a valve for controlling delivery of air to said cylinder, a gas valve for controlling delivery of gas to said cylinder, means for operating said valves in unison including a pivoted lever, an actuating rod connected to said governor, means connecting said rod and said pivoted lever for actuating the lever by said rod, a manually operable start and stop lever, a slip joint connection between said start and stop lever and said rod, said rod composed of a plurality of sections and a spring tension slip joint connecting the sections of the rod.

2. In an internal combustion engine including a cylinder, a governor, and having an exhaust outlet manifold, a valve for controlling delivery of air to said cylinder, a gas valve for controlling delivery of gas to said cylinder, means for operating said valves in unison including a pivoted lever, means for varying the position of the pivot point of said lever to control the proportional quantities of air and gas delivered to the cylinder including a pressure fluid actuated means for moving said pivot point, and thermal means subject to variations in the temperature of exhaust gases in said exhaust outlet for controlling delivery of pressure fluid to said pressure fluid actuated means.

3. In an internal combustion engine including a cylinder, a governor, and having an exhaust outlet manifold, a valve for controlling delivery of air to said cylinder, a gas valve for controlling delivery of gas to said cylinder, means for operating said valves in unison including a pivoted lever, means for varying the position of the pivot point of said lever to control the proportional quantities of air and gas delivered to the cylinder including a pressure fluid actuated means for moving said pivot point, and thermal means subject to variations in the temperature of exhaust gases in said exhaust outlet for controlling delivery of pressure fluid to said pressure fluid actuated means, an actuating rod connected to said governor means connecting said rod and said pivoted lever for actuating the lever by said rod, a manually operable start and stop lever, a slip joint connection between said start and stop lever and said rod, said rod composed of a plurality of sections, and a spring tension slip joint connecting the sections of the rod.

4. An internal combustion engine as claimed in claim 3 wherein said spring tension slip joint connecting the sections of the rod includes a cylinder connected to one end of one of said sections, a piston on the facing end of the other section and movable in said cylinder, and a tensioning spring in said cylinder engaging said piston to provide a yieldable connection between the two sections of said rod.

5. In an internal combustion engine including a cylinder, a governor, and having an exhaust outlet manifold, a valve for controlling delivery of air to said cylinder, a gas valve for controlling delivery of gas to said cylinder, means for operating said valves in unison including a floating lever, an actuating rod connected to said governor, a bell crank connected to said rod and operable upon movement of the rod, means connecting said bell crank and said floating lever to operate the floating lever upon movement of the rod, a fulcrum providing pivotal support to permit pivotal movement of said floating lever, and means adjustably supporting said fulcrum to permit adjustment of the pivotal point of said floating lever to vary the proportional degree of operation of said air and gas valves.

6. An internal combustion engine as claimed in claim 5 wherein said means adjustably supporting said fulcrum includes a pressure fluid operated means connected to the fulcrum of said floating lever, and thermal means operated by variances in the exhaust gases in the exhaust manifold of the engine for controlling the delivery of pressure fluid to said pressure actuated means to vary the position of said fulcrum.

7. An internal combustion engine as claimed in claim 2 wherein said engine includes spark ignition means, a timer for controlling the energizing of said spark ignition means, and pressure operated means operable in unison with said lever moving pressure actuated means for varying sequence of energizing of said spark ignition means.

8. An internal combustion as claimed in claim 5 wherein said engine includes spark ignition means, a timer for controlling energizing of said ignition means, and means operable in unison with said lever fulcrum positioning means for varying the setting of the timer.

References Cited in the file of this patent

UNITED STATES PATENTS

| | | |
|---|---|---|
| 1,899,869 | Heusser | Feb. 28, 1933 |
| 2,400,247 | Miller et al. | May 14, 1946 |
| 2,558,884 | Steven et al. | July 3, 1951 |